April 24, 1951  B. SAHLIN ET AL  2,550,204
CARTRIDGE BELT
Filed May 6, 1948  2 Sheets-Sheet 1
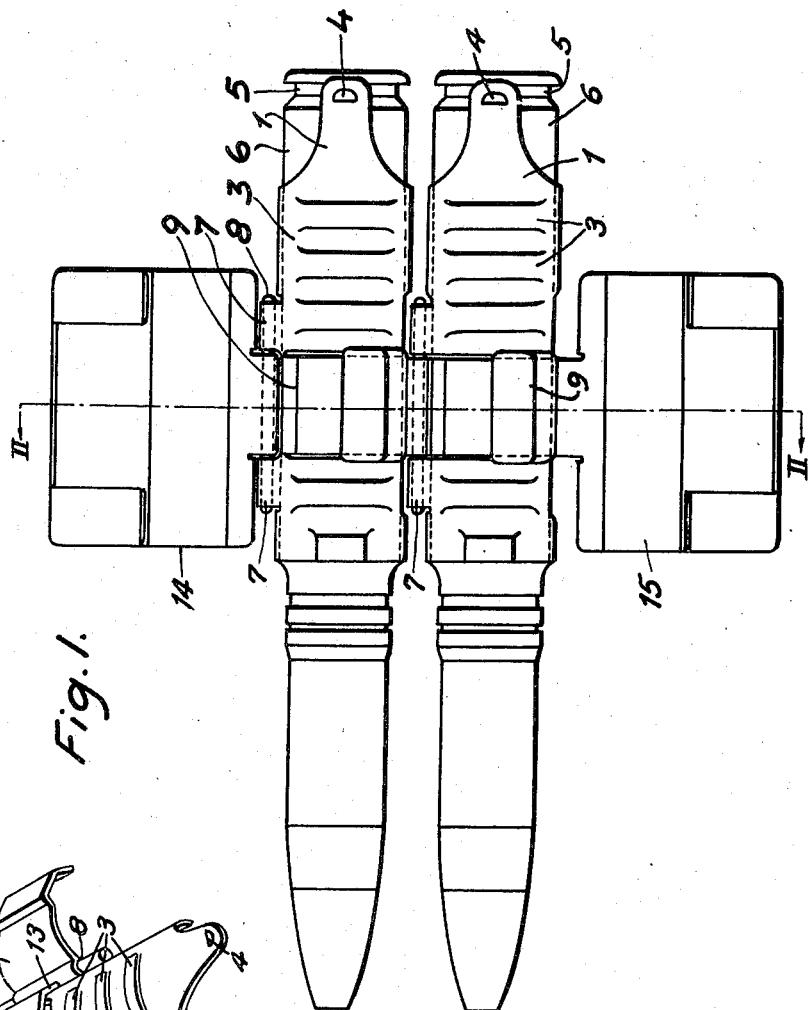
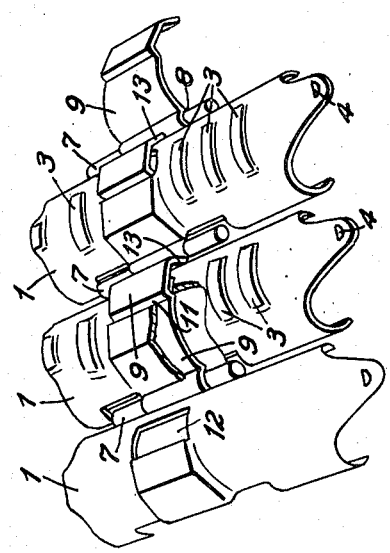
*INVENTORS*
BORJE SAHLIN and
EDVIN E. JANSSON, DECEASED.
BY HALVAR NYQVIST, EXECUTOR.

April 24, 1951     B. SAHLIN ET AL     2,550,204
CARTRIDGE BELT
Filed May 6, 1948     2 Sheets-Sheet 2
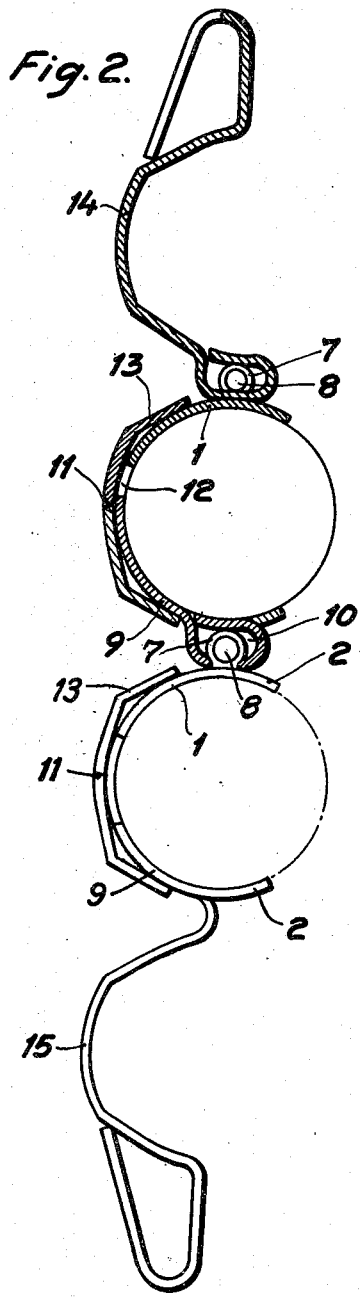
INVENTORS
BORJE SAHLIN and
EDVIN E. JANSSON, DECEASED.
BY HALVAR NYQVIST, EXECUTOR.

Patented Apr. 24, 1951

UNITED STATES PATENT OFFICE 2,550,204

CARTRIDGE BELT

Börje Sahlin, Stockholm, and Edvin Emanuel Jansson, deceased, late of Bofors, Sweden, by Halvar Nyqvist, executor, Bofors, Sweden, assignors to Aktiebolaget Bofors, Bofors, Sweden, a joint-stock company of Sweden Application May 6, 1948, Serial No. 25,487
In Sweden September 22, 1945

3 Claims. (Cl. 224—22)

1

The present invention relates to a cartridge belt, made up of sheet metal links detachable from each other and mainly arcuate in shape, wherein each link is arcuately secured to a connecting piece. This connecting piece has a shoulder or a stamped out portion which is so arranged as to enter a recess in the nearest link by means of a sharp bend thus connecting said link with the adjacent link. The depressed portion of the connecting piece is also provided with an elongated part arranged to press against the outside of the sheet metal link.

The device is characterized by a construction in which the end of the elongated part of the connecting piece is bent at an angle against the rest of the elongated part, and further in that the connecting piece is of such a length that it encircles nearly half of the periphery of the cartridge shell.

The invention will now be described with reference to the accompanying drawings where Fig. 1 is a plan view of two links, with cartridges placed therein, this view also showing the joining link and the terminal link of the cartridge belt. Fig. 2 is a view in section on a larger scale, this section being taken along the lines II—II in Fig. 1 and Fig. 3 is a perspective view of the cartridge belt.

On the drawing the numeral 1 designates a cross-section of metal links, which are mainly arcuate in shape, and which include fastening strips formed by the elongations of the side edges. The links 1 are provided at the rearward portion thereof with protruding lugs 3. These protruding lugs are provided with depressed placement shoulders 4, which seat in the rear track 5 of a cartridge shell 6 retained in the cartridge belt, and thus determine the longitudinal positioning of the metal link 1 along the body of the cartridge shell.

Each metal link 1 is provided adjacent a lower edge portion thereof with two pivot-receiving members. In these members there is inserted a pivot pin 8, which pin forms a pivot for a connecting piece 9. This connecting piece is also arcuate in cross section, and it is journalled on the pin 8 by means of an elongated aperture 10 formed thereon, thereby providing room for free play. The connection piece 9 is further provided with an abutment or a depression 11, which is arranged to enter an aperture 12 in the adjacent sheet-metal link, thereby forming along with the edge of the recess 12, a firm connection between the sheet metal link and the connecting piece. The connecting piece enters the link from the interior, and extends around the exterior part of the link. The depression 11 of the connecting piece 9 is provided with an elongated part 13, which presses against the outside of the metal link 1, thereby preventing it from being pulled out of the recess 12. In this way a shell placed in the metal link insures that the connecting piece shall be securely held in the recess and that the

2 links will therefore be kept together, as long as the shell remains in place.

The cartridge belt is further provided with two especially formed surplus links 14, 15 which are used in place of the first and last connecting piece. In this way easy insertion of a cartridge belt in the weapon is insured.

Having now described our invention, what we claim as new and desire to secure by Letters Patent is:

1. A cartridge belt, which comprises: a plurality of arcuately-shaped detachable metal links, each of said links being provided with an angular raised portion extending outwardly from the arc, less than 360 degrees, subtended by said link, each of said links being also formed with a pair of apertures therein, one aperture being located adjacent to each end of said arcuately-shaped link; and a connecting piece for each link, each of said connecting pieces being articulately connected to the corresponding link, and extending through said apertures in said link, the end of each of said connecting pieces extending through one of said apertures in said link being bent at an angle with respect to the adjacent portion of said connecting piece, and over and against said link whereby, when said cartridge belt is closed so that each of said links and the connecting pieces associated therewith encircle a cartridge shell, there results a cartridge belt in which each of said links is provided with a symmetrical raised portion on the exterior surface thereof.

2. A cartridge belt as defined in claim 1, wherein each connecting piece extends for a sufficient distance through and around each link to encircle approximately half of the periphery of the cartridge shell retained therein.

3. A cartridge belt as defined in claim 1, wherein each of said connecting pieces is formed with an abutment at the point at which it passes through one of said apertures in the corresponding link, said connecting piece abutting against said link at said abutment.

BÖRJE SAHLIN.
HALVAR NYQVIST,

*Executor of the Estate of Edvin Emanuel Jansson, Deceased.*

REFERENCES CITED

The following references are of record in the file of this patent:

UNITED STATES PATENTS

| Number | Name | Date |
|---|---|---|
| 2,373,288 | Becker | Apr. 10, 1945 |

FOREIGN PATENTS

| Number | Country | Date |
|---|---|---|
| 60,350 | Austria | July 25, 1913 |
| 157,173 | Austria | Oct. 10, 1939 |
| 459,631 | Great Britain | Jan. 12, 1937 |